May 7, 1940.　　　　　M. HORN ET AL　　　　　2,200,113
SIGNAL MEANS FOR COMPRESSED FLUID DELIVERING APPARATUS
Filed May 16, 1939　　　　2 Sheets-Sheet 1

INVENTOR
Meyer Horn and Joseph Ross.
BY Moses & Nolte
ATTORNEYS

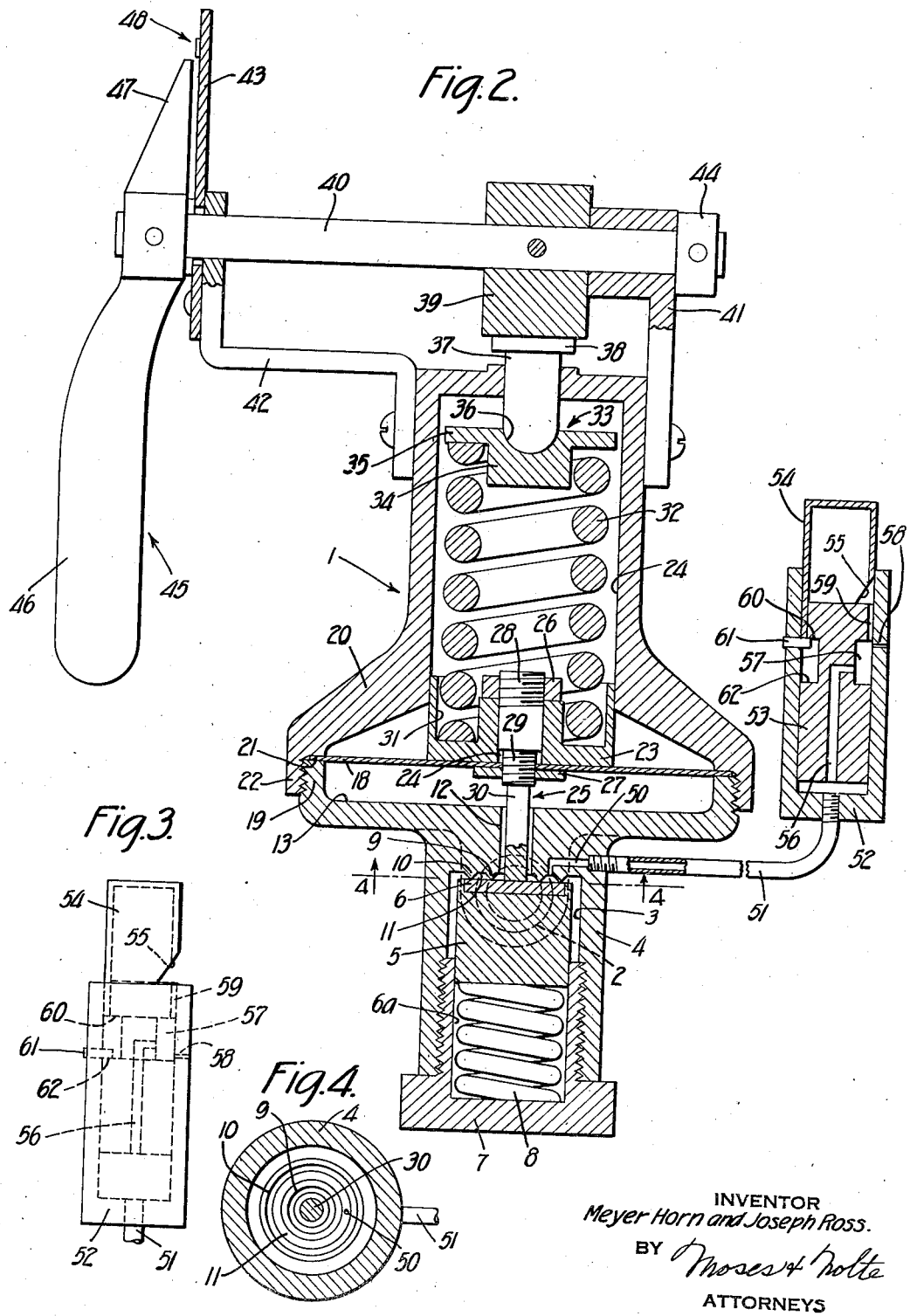

Patented May 7, 1940

2,200,113

UNITED STATES PATENT OFFICE

2,200,113

SIGNAL MEANS FOR COMPRESSED FLUID DELIVERING APPARATUS

Meyer Horn, Maplewood, N. J., and Joseph Ross, Flushing, N. Y.

Application May 16, 1939, Serial No. 273,916

4 Claims. (Cl. 116—65)

This invention relates to apparatus for delivering compressed fluid at predetermined pressure as, for example, the type of apparatus employed at automobile service stations for inflating vehicle tires. The utility of the invention is not, however, confined to tire inflating apparatus, since the invention may be used for industrial purposes such as the charging of compressed gases into vessels or containers. For illustrative purposes, however, the ensuing description will be confined to tire inflating apparatus.

Tire inflating apparatus now commonly employed at service stations includes pressure responsive means settable to cut off automatically the delivery of air to a tire when the set pressure has been produced in the tire. Such apparatus also commonly includes a signal device which is sounded intermittently but at progressively longer intervals so long as air is being delivered at a substantial rate. This type of signal is not altogether satisfactory. The user of the equipment is required to wait for a considerable time after the delivery of air has been actually shut off to make sure that the bell will not ring again. Such delay is objectionable both because of the loss of the driver's time, and also because there are frequently other drivers anxious to secure the attention of the filling station attendant who is engaged, or to occupy the space of the vehicle whose tires are being inflated.

It is an object of the present invention to provide an improved kind of signal in connection with an apparatus for delivering compressed fluid. To this end it is a feature of the invention that provision is made of a fluid operated signal device which is connected to the air delivery line in such a manner that it will continuously give an audible signal until the delivery pressure for which the apparatus is set has been attained, but will cut off definitely and sharply as soon as that practical result has been secured.

Important features of the invention have to do with the construction and arrangement of the signal device, itself, also with the manner of regulating the delivery of compressed fluid to the signal device both to assure that it will be cut off at the desired point, and also to assure that it will be cut off in an abrupt and definitely understandable manner.

To these ends it is an important point of the invention that a pressure responsive control valve, operable toward and from a seat to control the delivery of fluid, is made effective when seated to cut off the fluid operated signal device from all communication with the fluid transmission line. This result is desirably secured by connecting the signal device to the transmission line through a port located in the valve seat in position to be completely sealed off from the remainder of the line by the closing of the valve.

By virtue of this arrangement the signal device can only be supplied with operating fluid when fluid is flowing past the valve seat. Neither the source pressure nor the tire pressure can be applied to the signal device when the valve is closed.

The signal device desirably includes a whistle. In order that the whistle signal shall be caused to terminate abruptly, and not merely to be converted into a hissing noise as it gradually dies out, the whistle proper is desirably mounted upon a piston which is slidable in a cylinder. The piston normally rests at or near a closed end of the cylinder, in a position such that the air exit of the whistle is covered by the cylinder so that no air can escape past the sounding part of the whistle to sound the signal. When fluid is transmitted to the closed end of the cylinder, however, the piston is raised and caused to carry the sounding part of the whistle clear of the cylinder. Fluid is then discharged through a passage in the piston, being directed by such passage to cause the whistle signal to be sounded.

In order to cause the piston to drop as soon as the fluid supply to the whistle falls below a value sufficient to maintain an effective whistle signal, provision is made for constantly bleeding fluid from the cylinder. So long as there is a substantial flow of fluid past the automatic valve, the piston will be held up and the whistle will be sounded, but as the rate of air delivery falls away, the supply of fluid to the cylinder chamber of the whistle is reduced, and the pressure is quickly exhausted, so that the air exit of the whistle is carried downward without undue delay into the cylinder, thus causing the whistle signal to be sharply terminated.

Other objects and advantages will hereinafter appear.

In the drawings forming part of this specification and illustrating a practical and advantageous embodiment of the invention:

Figure 2 is a view in sectional elevation taken upon the line 2—2 of Figure 1 looking in the direction of the arrows;

Figure 3 is a detail view showing the whistle parts in position for sounding a signal; and Figure 4 is a fragmentary, detail, sectional view, taken on the line 4—4 of Figure 2 looking in the direction of the arrows.

Figure 1:
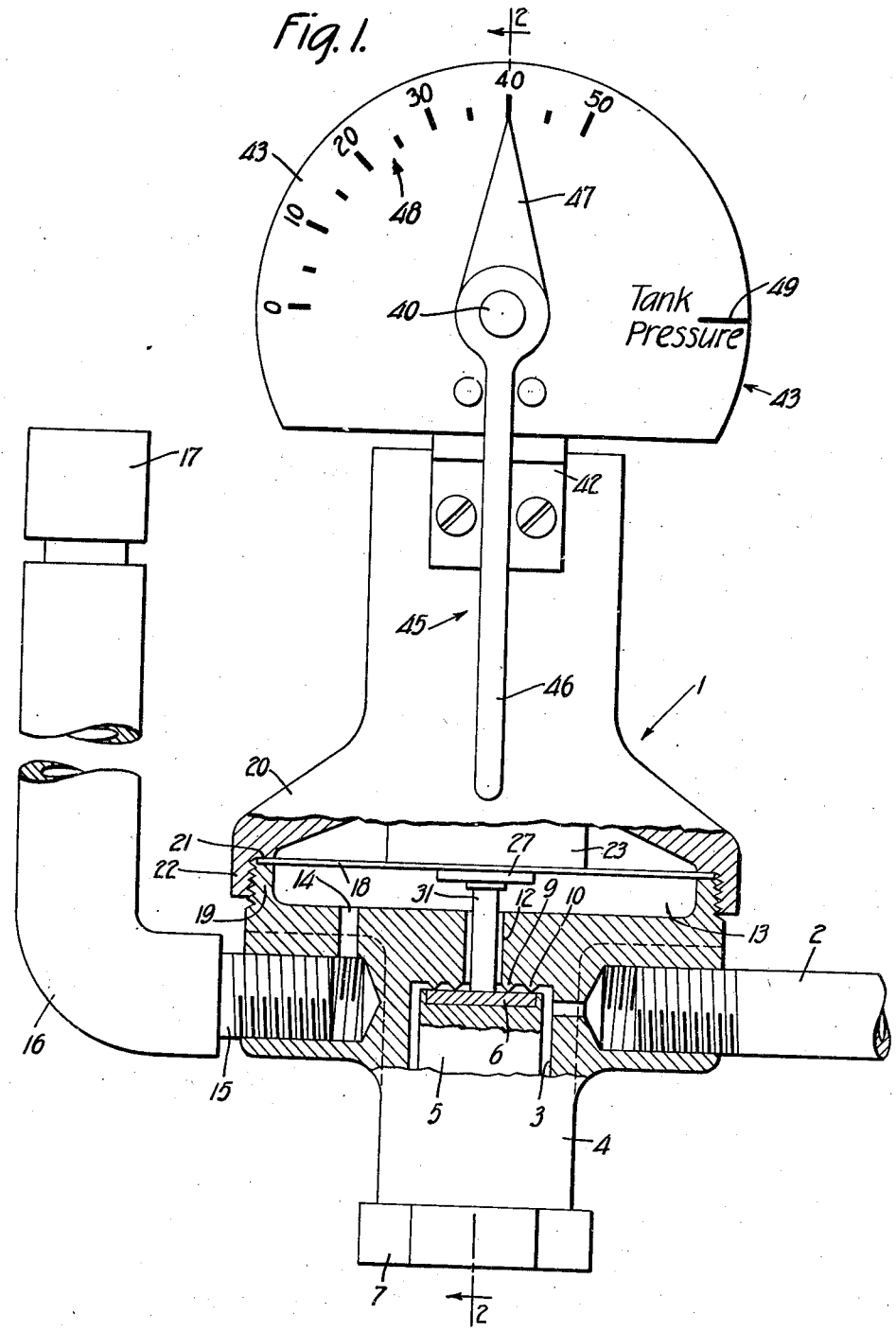
Figure 1 is a fragmentary view, partly broken away, illustrating the indicator and automatic control mechanism of an apparatus for delivering compressed fluid.

A delivery apparatus 1 for compressed fluid is partially illustrated in Figures 1 and 2. This apparatus comprises a tube 2 which communicates with a suitable source of supply of compressed fluid (a compressor tank) and delivers the fluid to a valve chamber 3 formed in a valve body member or valve seat member 4. The valve proper consists of a cylindrical block 5 having a facing insert 6 of suitable yielding and resilient material set therein. The valve member 5 is slidable in a bore 6a formed in a plug 7, which plug is threaded into the lower end of the valve body member 4. A compression coil spring 8, disposed in the bore 6, supports the valve 5 and normally maintains the valve insert 6 against a valve seat which is formed in the valve body member 4. The construction and arrangement of the valve seat is important, but the importance and utility of the particular valve seat construction will be discussed more in detail at a subsequent point, the purpose being for the present to describe the general organization and arrangement of parts so as to give a comprehensive view of the apparatus.

The valve seat includes an inner circular rib 9 and an outer circular rib 10 with an intervening annular channel 11. When the valve is open, the compressed fluid flowing through the tube 2 enters the space, chamber 3, in the valve body which surrounds the valve 5, and flows across the valve seat and through a bore 12 into the diaphragm chamber 13. From the diaphragm chamber 13 the air is delivered through a passage 14 into a coupling 15 and thence through a flexible hose 16 to a delivery chuck 17 of conventional construction. The chuck 17 is equipped as usual with an automatic valve, the arrangement being such that the chuck valve will be mechanically opened by the application of the chuck to the tire valve, but will be closed as soon as the chuck is disengaged from the tire valve.

A flexible diaphragm 18 is mounted upon the upper, open end of the valve body member 4, being marginally clamped between a flange 19 of the valve body and a cooperating housing member 20. The housing member 20 is desirably formed with an annular, diaphragm-engaging seat 21 and with a circular threaded flange 22, said flange being threaded for engagement with the flange 19 of the valve body 4. The diaphragm 18 constitutes a pressure responsive element which is provided for enabling the valve 5 to cut off the delivery of air to the hose 16 when the air pressure in the diaphragm chamber 13 attains a predetermined value.

The diaphragm 18 has secured to it a cylindrical guide block 23 which is engaged with the upper side of the diaphragm 18, and which is guided in a cylindrical bore 24 formed in the housing member 20. A stem 25 is passed through the block 23 and the diaphragm 18 and has clamping nuts 26 and 27 threaded upon it above the block and below the diaphragm for clamping the block and diaphragm firmly to one another and in fixed position lengthwise of the stem. The stem 25 has an upper portion 28 of large diameter to which the nut 26 is threaded, an intermediate portion 29 of somewhat less diameter onto which the nut 27 is threaded, and a lower end portion 30 of still smaller diameter which extends through the passage 12 in the valve body and normally bears against the insert 6 of the valve member 5.

The guide block 23 is formed with an annular seat 31 for receiving the lower end of a compression coil spring 32. A block 33 is supported upon the upper end of spring 32, this block including a guiding boss 34 which extends down into the spring, a circumferential flange 35 which rests upon the upper end of the spring, and a socket 36 in which the rounded lower end of a plunger 37 bears. The plunger 37 is in the form of a cam follower, being equipped with a head 38 for bearing against the under face of a cam 39.

The cam 39 is fixed upon a shaft 40. The shaft 40 is rotatably mounted in bearing brackets 41 and 42 affixed to the housing member 20. A dial plate 43 is rigidly supported by the bracket 42. A collar 44 is affixed to the rear end of the shaft 40 and serves, in cooperation with the cam 39, to prevent endwise movement of the shaft 40. A setting lever 45 is affixed to the forward end of the shaft 40, being located closely adjacent to the dial plate 42. The lever 45 comprises a handle portion 46 and a pointed index portion 47, the latter for cooperating with an index scale 48 which is provided upon the dial plate 43.

The handle 46 may be operated to locate the index pointer 47 opposite any portion of the graduated scale 48 or opposite an index mark 49 designated "Tank pressure." Rotation of the shaft 40 through the handle 46 turns the cam 39 to adjust the pressure applied to the diaphragm 18 through the plunger 37, the block 33, the spring 32 and the block 23. The construction and arrangement of the parts are such that the diaphragm 18 will permit the valve block 5 to become seated at the pressure indicated on the dial by the index pointer 47, when the index pointer points at any part of the graduated scale 48. When the index pointer is swung around to the point of graduation 49 (tank pressure), the automatic valve 4—5 is incapacitated and air will continue to flow through the chuck 17 so long as the chuck valve is held open.

The normal position of the parts when the chuck valve is closed is that illustrated in Figures 1 and 2. When the parts are in the condition here shown, the fluid pressure against the diaphragm 18 is sufficient to offset the loading applied through the spring 32 to the diaphragm, and hence the portion 30 of the diaphragm stem is drawn upward far enough to permit the valve 5 to become seated.

Assuming that the apparatus is set to deliver air at 40 pounds pressure, as indicated in Figure 1, and assuming further that the tire or receptacle to which the chuck is applied initially contains no air, or air at some pressure less than 40 pounds per square inch, the pressure in the diaphragm chamber 13 will promptly fall upon application of the chuck to the tire valve, and the spring loading on the diaphragm will cause the diaphragm to bulge downwardly. The stem portion 30 will, therefore, be thrust downwardly and will thrust the valve member 5 away from its seat against the force of the spring 8. As the pressure in the tire builds up, the valve member 5 will gradually return toward seating relation, and will become seated when the tire pressure reaches a value of 40 pounds per square inch.

The salient features of the present invention have to do with the provision of a signaling device for an apparatus of the kind thus far described, and with the construction and arrangement of the parts to cause the signal operating fluid to be taken from a region which can be shut off both from the source pressure and from the tire pressure.

As previously pointed out, the valve insert 6 seats against two edged, circular rings 9 and 10, which define an annular channel 11 between them. A passage 50 extends from the base of the channel 11 through the valve body and communicates through tubing 51 with the lower or closed end of a cylinder 52. A piston 53 is slidably mounted in the cylinder 52 and carries at its upper end a hollow whistle body 54 which substantially fits the cylinder. The whistle body 54 has an air exit opening 55 through which the whistle sounding air escapes. A passage 56 through the piston 53 communicates with a wide, circumferential groove or channel 57 which is formed externally of the piston between the ends of the piston. A bleeder passage 58 through the wall of the cylinder 52 communicates with the channel 57 for preventing the trapping of air in the cylinder below the piston 53. A passage 59 extends upward from the groove 57 through the piston for delivering air to the vibrating portion of the whistle.

In the normal position of the parts as illustrated in Figures 1 and 2, the piston 53 is in its down position wherein the upper wall 60 of the groove or channel 57 bears against an abutment 61 fixed in the cylinder wall. When the valve member 5 is moved away from its seat, air flows to the lower end of the cylinder 52, and raises the piston to a position like that illustrated in Figure 3, wherein the lower wall 62 of the groove or channel 57 bears against the abutment pin 61. This carries the whistle upward so that air can escape through the passages 59 and 55 to produce a whistle signal. So long as air is being delivered to the tire at a practically rapid rate, sufficient pressure will be maintained in the lower end of the cylinder 52 to maintain the piston and the whistle body in the raised position of Figure 3, notwithstanding the fact that air is constantly being let out through the bleeder passage 58 and through the whistle sounding passage 59. As the valve 5 comes near to the shut-off point, however, the delivery of air through the tubing 51 will be substantially diminished and the piston 53 will promptly fall to carry the opening 55 down into the cylinder. This results in a sharp termination of the whistle signal. The piston 53 is made heavy enough to assure that there will be sufficient pressure in the cylinder 52 to blow a clear whistle note so long as the opening 55 is held up in an uncovered position.

It has been mentioned that the fact that the signal operating air is taken off from the seat of valve 4—5 at a point contained within the seating area is considered important from the standpoint of securing a practical and satisfactory signal operation. This feature is important both from the standpoint of securing a practical and dependable signal, and also from the standpoint of avoiding delay in cutting off the signal when a satisfactory tire pressure has been secured.

With reference to the first point, it is apparent, of course, that if the signal air were taken off from any point between the outer seat rib 10 and the source of pressure, the signal would be sounded constantly, both when the apparatus is idle and when it is in use, and the user would have nothing to guide him as to the completion of the inflating operation. If the signal air were taken off from any point between the inner seat rib 9 and the chuck 17, the whistle would be exposed to tire pressure at least so long as the chuck valve remained open. This means that the user would hear the signal as long as the chuck is held on the tire valve, regardless of whether or not the valve 4—5 has shut off the delivery of air to the tire. Here again the whistle would give no useful indication.

The taking of the signal air from a point between the seat ribs 9 and 10 assures that the signal device will be cut off both from the source pressure and from the tire pressure as the valve 4—5 closes. The fact, moreover, that the annular channel 11 is of very small volume has the effect of preventing the useless prolongation of the signal which would occur if the signal air were taken from an air space of large volume.

We have described what we believe to be the best embodiments of our invention. We do not wish, however, to be confined to the embodiments shown, but what we desire to cover by Letters Patent is set forth in the appended claims.

1. In an apparatus for delivering compressed fluid, the combination with a fluid transmission line, of a pressure responsive shut-off valve therein, a fluid operated signal device for indicating the condition of the valve, means responsive to the condition of the valve for transmitting signal operating fluid to the signal device only so long as the valve is open, said signal device comprising a cylinder closed at one end and open at the other, a piston slidable in the cylinder, and a whistle carried by the piston, said cylinder having a fluid admission port in the closed end thereof, said whistle being normally covered by the cylinder and thereby maintained inoperative but adapted to be projected by the fluid operated piston to an operative position, and said piston being formed to direct the operating fluid upon the whistle when the whistle is in an operative position, said whistle and piston being operable by gravity to return the same to normal inoperative position immediately upon the closing of the valve.

2. In an apparatus for delivering compressed fluid, the combination with a fluid transmission line, of a pressure responsive shut-off valve therein, a fluid operated signal device for indicating the condition of the valve, means responsive to the condition of the valve for transmitting signal operating fluid to the signal device only so long as the valve is open, said signal device comprising a whistle, means normally covering the whistle and maintaining the whistle inoperative, and fluid operated means for uncovering the whistle, said whistle being operable by gravity to return the same to normal inoperative position immediately upon the closing of the valve.

3. An apparatus as set forth in claim 1 in which provision is made for bleeding off the signal operating fluid to cause the sounding of the whistle to be terminated sharply when the fluid supply to the signal device is cut off.

4. In an apparatus for delivering compressed fluid, the combination with a fluid transmission line, of a pressure responsive shut-off valve therein, a fluid operated signal device for indicating the condition of the valve, means responsive to the condition of the valve for transmitting signal operating fluid to the signal device only so long as the valve is open, said signal device comprising a whistle, means normally covering the whistle and maintaining the whistle inoperative, fluid operated means for projecting the whistle outward to an operative position, and means for limiting outward movement of the whistle, said whistle being operable by gravity to return the same to normal inoperative position immediately upon the closing of the valve.

JOSEPH ROSS.
MEYER HORN.